(12) United States Patent
Colic et al.

(10) Patent No.: US 7,222,603 B2
(45) Date of Patent: May 29, 2007

(54) SUBUNIT FOR AN ADDITIONAL CONTROL VALVE DEVICE USED FOR AN INTAKE PIPE OF A RECIPROCATING INTERNAL COMBUSTION ENGINE

(75) Inventors: Rajko Colic, Bad Homburg (DE); Herbert Severien, Linsengericht (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/563,805

(22) PCT Filed: Jun. 17, 2004

(86) PCT No.: PCT/EP2004/051145

§ 371 (c)(1),
(2), (4) Date: Jan. 9, 2006

(87) PCT Pub. No.: WO2005/012773

PCT Pub. Date: Feb. 10, 2005

(65) Prior Publication Data

US 2006/0180784 A1     Aug. 17, 2006

(30) Foreign Application Priority Data

Jul. 31, 2003  (DE) .................. 103 35 136

(51) Int. Cl.
*F02D 9/12* (2006.01)
*F16K 1/12* (2006.01)
(52) U.S. Cl. .................. 123/336; 123/403; 123/442; 251/129.07; 251/322
(58) Field of Classification Search ................ 123/336, 123/337, 403, 442; 251/57, 129.07, 129.16, 251/322
See application file for complete search history.

(56) References Cited

U.S. PATENT DOCUMENTS

| | | | |
|---|---|---|---|
| 3,119,405 A | 1/1964 | Guy | |
| 4,142,707 A | 3/1979 | Bjorklund | |
| 6,637,405 B2 | 10/2003 | Kreuter | |
| 6,832,749 B2 | 12/2004 | Schuerg et al. | |
| 6,892,997 B2* | 5/2005 | Kreuter | 251/129.16 |
| 7,165,327 B2* | 1/2007 | Colic et al. | 251/322 |
| 2002/0134953 A1 | 9/2002 | Schuerg et al. | |
| 2003/0024502 A1 | 2/2003 | Kreuter | |

FOREIGN PATENT DOCUMENTS

| | | |
|---|---|---|
| DE | 195 31 985 A1 | 3/1997 |
| DE | 101 37 828 A1 | 2/2003 |
| EP | 0 727 600 A1 | 8/1996 |
| EP | 1 323 968 A1 | 7/2003 |
| JP | 08247301 A | 2/1996 |
| WO | WO 01/94821 A1 | 12/2001 |

OTHER PUBLICATIONS

Derwent Abstract—DE 195 31 985 A1 Mar. 6, 1997 Herr Marco, 52064 Aachen, GERMANY.
Derwent Abstract—DE 101 37 828 A1 Feb. 20, 2003 Meta Motoren- und Energietechnik GmbH, 52134 Herzogenrath, GERMANY.
Derwent Abstract—EP 1 323 968 A1 Jul. 2, 2003 Techspace Aero S.A., 4041 Herstal, BE.
Derwent Abstract—EP 0 727 600 A1 Aug. 21, 1996 Georg Fischer Rohrleitungs-systeme AG, 8201 Schaffhausen, SWITZERLAND.

* cited by examiner

*Primary Examiner*—T. M. Argenbright

(57) ABSTRACT

Disclosed is a subunit having a hollow cylinder which is provided with an opening on at least one face and in which a spring bearing is arranged on the inside of the face and a first valve spring resting against said spring bearing. A shaft that is guided within the spring bearing is disposed in the first valve spring so as to be reversibly movable in the direction of the longitudinal axis of the hollow cylinder. A thrust bearing for the first valve spring is located at the end of the shaft, which faces away from said face of the hollow cylinder, the thrust bearing being connected to the shaft. A second valve spring is placed between the thrust bearing and the interior on the opposite face of the hollow cylinder.

8 Claims, 2 Drawing Sheets

SUBUNIT FOR AN ADDITIONAL CONTROL VALVE DEVICE USED FOR AN INTAKE PIPE OF A RECIPROCATING INTERNAL COMBUSTION ENGINE

BACKGROUND OF THE INVENTION

Additional control valve device for an intake pipe of a reciprocating internal combustion engine having a component, which is composed of a hollow cylinder which has an opening at at least one end side and in which a spring bearing is arranged on the inside of this end side, on which spring bearing a first valve spring bears, a stem which is guided in the spring bearing being arranged so as to be reversibly displaceable in the direction of the longitudinal axis of the hollow cylinder in said first valve spring, a counterbearing for the first valve spring being arranged at the end of the stem facing away from this end side of the hollow cylinder, said counterbearing being connected to the stem, and in which component a second valve spring is arranged between the counterbearing and the inside of the opposite end side of the hollow cylinder.

The invention relates to a component for an additional control valve device for an intake pipe of a reciprocating internal combustion engine. Additional control valve devices for reciprocating internal combustion engines are known. Their method of functioning is described, for example, in DE 101 37 828 A1/US2003/0024502 A1. In this additional control valve device there is provision for a valve element to be arranged which is essentially of mushroom-shaped design and which is guided in a reversibly movable fashion in a guide in the direction of the longitudinal axis of the additional control valve device. In this valve element, a hat-shaped plate, which is formed so as to be concave with an apex point in the direction of the side facing away from the inlet pipe, is arranged on a stem. During operation, this valve element is moved between the gantry magnet and the trapping magnet. In this way the respectively desired open position or closed position of the additional control valve device is set. The stem of the valve element ends at a collar. A first spring is supported between the collar and the bottom of the blind hole in which the stem is guided. Between the collar and the other end of the blind hole a further spring is supported. In this way, the valve element forms, together with the two springs, a system which is capable of oscillating and which is held in a central position by the springs. The natural frequency of the system which is capable of oscillating is given by spring constants and the weight of the valve element. This ensures that an extremely quick changeover between the open position and the closed position is possible, the gantry magnet and the trapping magnet, between which the valve element is guided in a reversibly movable fashion, each having to apply only the retaining force and the kinetic energy being stored in the springs. Such additional control valve devices are used for pulsed charging of spark ignition and diesel engines. The pulsed charging brings about an increase in the cylinder charge and thus an increase in the torque in the lower and central rotational speed range. However, with the known additional control valve devices it is disadvantageous that a large number of single parts which have a relatively large influence on one another in terms of force have to be assembled. In the currentless central position between the mechanical stops, the valve plate must assume a central position with very narrow tolerances between the gantry magnets and the trapping magnets in order to ensure the function of the actuator with the lowest possible force level at the electromagnet. With the customary additional control valve devices this is possible only with very costly manual adjustment or readjustment of the positions of, for example, the bearing points for the valve springs. For large scale production of additional control valve devices this thus results in relatively severe problems which are due to the fact that an optimum central position of the valve plate in which the valve plate is at the same distance from the gantry magnet as from the trapping magnet cannot be set, or can only be set rarely, owing to fabrication tolerances even if the individual parameters are stipulated precisely in terms of engineering.

EP 1 323 568 A1 describes a valve for a sewage line, U.S. Pat. No. 4,142,707 describes a switch-off valve for a fuel line and EP 727 600 A1 describes a valve for a line for regulating the throughflow rate. All the valves are not suitable for arrangement in the intake pipe of a reciprocating internal combustion engine.

SUMMARY OF THE INVENTION

The invention is therefore based on the object of providing an additional control valve device for an intake pipe of a reciprocating internal combustion engine which permits the disadvantageous influence of fabrication tolerances of the individual parts to be largely compensated. Furthermore, the device is to permit large scale manufacture of additional control valve devices in a relatively simple way.

The object on which the invention is based is achieved by virtue of the fact that the component is secured in a guide of the additional control valve device.

The spring bearing is of circular design and, if appropriate, provided with grooves in which the first valve spring can engage. The first valve spring and the second valve spring are each pressure springs. The stem is of tubular design in the form of a sleeve and is part of the valve element of the additional control valve device. In the assembled state of the additional control valve device the stem is connected to the valve plate. It is guided in the spring bearing, that is to say the stem extends through the spring bearing and is supported at the same time by the spring bearing. The counterbearing is of circular design and can also have grooves which serves to hold the first valve spring or the second valve spring. The counterbearing is connected to the stem, with central screwed connections being conceivable and advantageous. It has surprisingly become apparent that the adverse effect of fabrication tolerances which occur in particular during the manufacture of the first valve spring, the second valve spring and when the counterbearing and the spring bearing are arranged, can be avoided if a plurality of individual parts are combined in a hollow cylinder to form one component. The finished component is then relatively easily pressed into the guide of the additional control valve device. However, it is also possible to secure the component in the guide of the additional control valve device in some other way, it being possible to use customary attachment means. Since the component is secured simply in an additional control valve device it is particularly advantageously suitable for use in large scale manufacture of additional control valve devices. At the same time it is advantageous that the component can be positioned relatively easily in the guide of the additional control valve device in such a way that a virtually optimum central position of the valve element that is composed of the valve plate and the stem can be set in the currentless additional control valve device. If defined dimensional accuracy of the premounted component is maintained, a more closely toleranced central position of the valve element without additional measuring and adjustment work can be realized in the final mounting stage by pressing in the component by a fixed amount. In addition, the component advantageously permits functional checking in advance, which has an advantageous effect on the operational reliability of the additional control valve device.

One preferred refinement of the invention consists in the fact that the end of the stem which faces away from the counterbearing projects out of the hollow cylinder through the opening. It is advantageous here that after the installation of the component in the guide of the additional control valve device the valve plate can be pushed with its central collar onto the end facing away from the counterbearing, and preferably welded. It is of course necessary here for the external diameter of the stem to be somewhat smaller than the internal diameter of the surrounding collar of the valve plate. In this way the valve plate can be connected to the stem at an optimum position on it, which in turn has an advantageous effect on the setting of the central position of the valve element between the gantry magnet and the trapping magnet.

According to one further preferred refinement of the invention, the stem and the counterbearing are composed of a single part. This simplifies the manufacture of the component for the additional control valve device.

A further preferred refinement of the invention provides for the opposite end side of the hollow cylinder to have a circumferential collar on the inside. This circumferential collar may be manufactured advantageously by beading. It is advantageous here that the second valve spring experiences particularly good fixing at its end facing away from the counterbearing.

According to a further preferred refinement of the invention, the spring bearing and the hollow cylinder are composed of an single part. This is advantageous if both the spring bearing and the hollow cylinder are fabricated from a relatively hard metallic substance, and this then facilitates the fabrication of the component in an advantageous way since a single part can be dispensed with.

BRIEF DESCRIPTION OF THE SEVERAL VIEWS OF THE DRAWINGS

The invention is explained in more detail below by way of example with reference to the drawing (FIGS. 1 to 3).

DETAILED DESCRIPTION OF THE INVENTION

Figure 1:
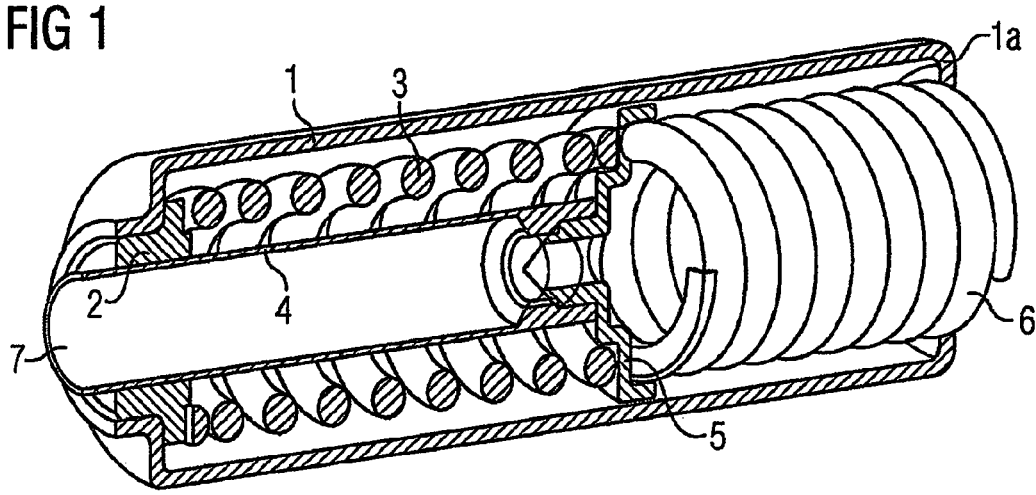
FIG. 1 shows the component in longitudinal section in a three-dimensional form.

FIG. 1 shows the component for an additional control valve device for an intake pipe of a reciprocating internal combustion engine in longitudinal section in a three-dimensional form. The component is composed of a hollow cylinder 1 which has an opening at one end side and in which a spring bearing 2, against which a first valve spring 3 bears, is arranged on the inside of this end side. A stem 4 which is guided in the spring bearing 2 is arranged in the valve spring 3 in a reversibly displaceable fashion in the direction of the longitudinal axis of the hollow cylinder 1, with a counterbearing 5 for the first valve spring 3 being arranged at the end of the stem 4 facing away from this end side of the hollow cylinder 1. This counterbearing 5 is connected to the stem 4, this being done by means of a central screwed connection. A second valve spring 6 is arranged between the counterbearing 5 and the inside of the end side 1a of the hollow cylinder 1 lying opposite. The end 7 of the stem 4 facing away from the counterbearing 5 projects out of the hollow cylinder 1 through the opening.

Figure 2:
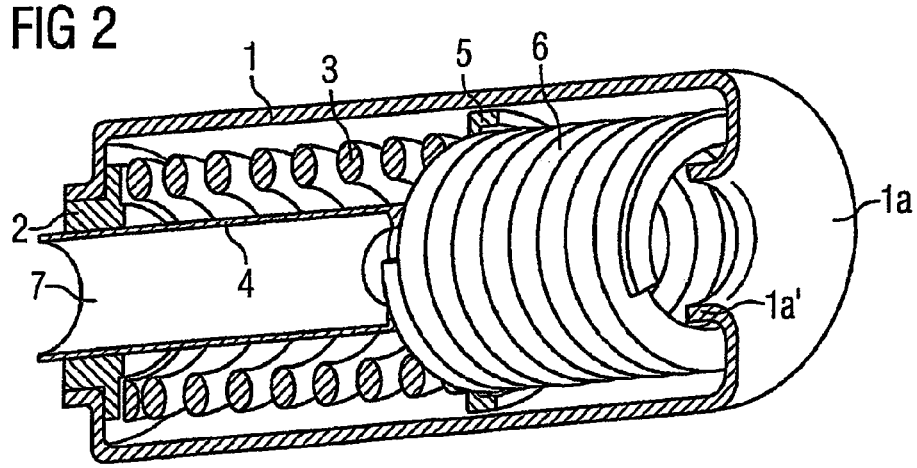
FIG. 2 shows the component in longitudinal section in a three-dimensional form from a different perspective.

FIG. 2 illustrates the component in longitudinal section in a three-dimensional form from a different perspective. The end side 1a of the hollow cylinder 1 lying opposite has a circumferential collar 1a' on the inside. This easily improves the fixing of the second valve spring 6.

Figure 3:
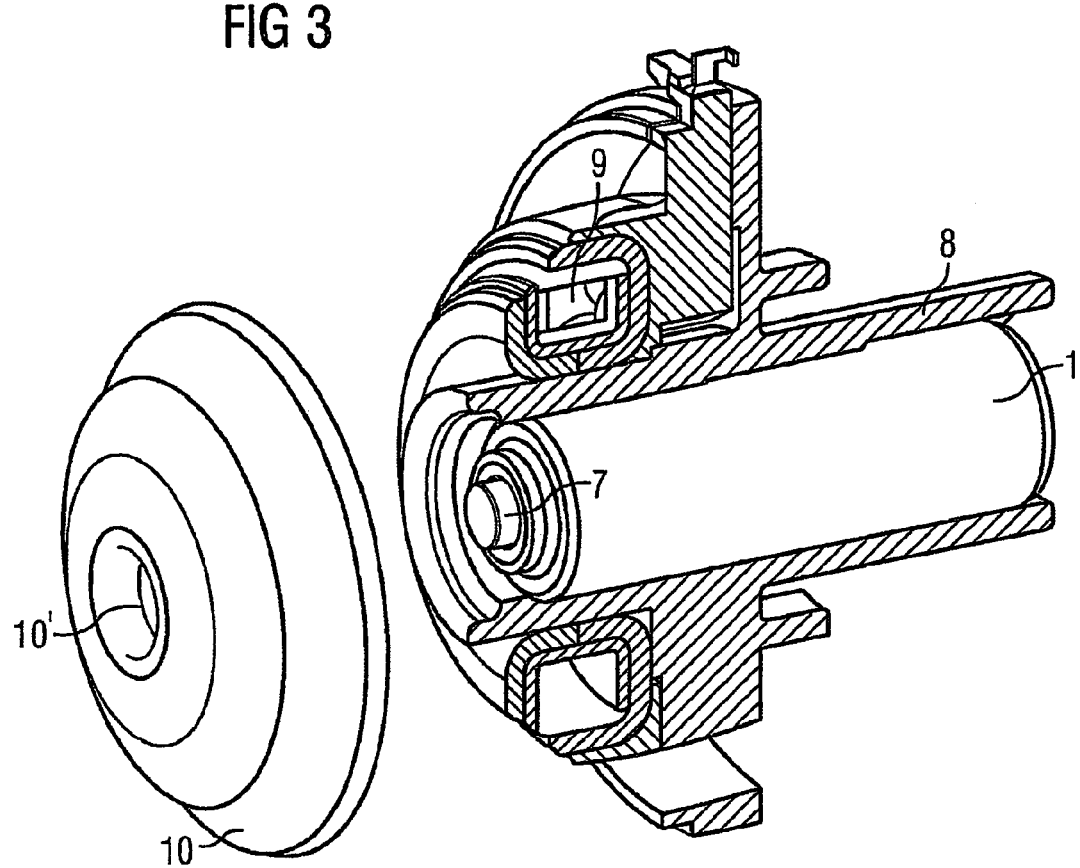
FIG. 3 shows the arrangement of the component in the guide of an additional control valve device.

The arrangement of the component for an additional control valve device in the guide 8 of the additional control valve device is illustrated in longitudinal section in a three-dimensional form in FIG. 3. The guide 8 is surrounded here by the trapping magnet 9, a ring magnet. The component can relatively easily be pressed by a fixed amount into the guide 8 of the additional control valve device. After the component has been positioned in an optimum way in the guide 8 of the additional control valve device, the valve plate 10, which has a circumferential collar 10' in the center, can be pushed with the circumferential collar 10' onto the end 7 of the stem facing away from the counterbearing 5. This is done in such a way that the valve plate 10 then bears against the trapping magnet 9. The valve disk 10 is then connected to the end 7 of the stem, this being advantageously done by welding. In this way all the distances and positions of the parts are realized in such a way that the disadvantages which usually arise due to fabrication tolerances are compensated. This is particularly advantageous for large scale production.

The invention claimed is:

1. An additional control valve device for an intake pipe of a reciprocating internal combustion engine having a component, comprising: a hollow cylinder which has an opening at at least one end side and in which a spring bearing is arranged on the inside of this end side, on which spring bearing a first valve spring bears, a stem which is guided in the spring bearing being arranged so as to be reversibly displaceable in the direction of the longitudinal axis of the hollow cylinder in said first valve spring, a counterbearing for the first valve spring being arranged at the end of the stem facing away from this end side of the hollow cylinder, said counterbearing being connected to the stem, and in which component a second valve spring is arranged between the counterbearing and the inside of the opposite end side of the hollow cylinder, and wherein in that the component is fixed in a guide of the additional control valve device.

2. The additional control valve device according to claim 1, wherein the end of the stem which faces away from the counterbearing projects out of the hollow cylinder through the opening.

3. The additional control valve device according to claim 1, wherein the stem and the counterbearing are composed of a single part.

4. The additional control valve device according to claim 1, wherein the opposite end side of the hollow cylinder has a circumferential collar on the inside.

5. The additional control valve device according to claim 1, wherein the spring bearing and the hollow cylinder are composed of a single part.

6. The additional control valve device according to claim 1, wherein a valve plate is arranged to be pushed with a central circumferential collar onto the stem.

7. The additional control valve device according to claim 6, wherein the valve plate is welded to the end of the stem.

8. The additional control device according to claim 1, wherein the component is arranged to be pressed into the guide.

* * * * *